United States Patent
Takahashi et al.

(10) Patent No.: US 10,525,623 B2
(45) Date of Patent: Jan. 7, 2020

(54) MOLD OPENING/CLOSING DEVICE

(71) Applicant: U-MHI PLATECH CO., LTD., Nagoya-shi, Aichi (JP)

(72) Inventors: Shinichi Takahashi, Tokyo (JP); Naoki Kato, Aichi (JP); Toshihiko Kariya, Aichi (JP)

(73) Assignee: U-MHI PLATECH CO., LTD., Aichi (JP)

( * ) Notice: Subject to any disclaimer, the term of this patent is extended or adjusted under 35 U.S.C. 154(b) by 80 days.

(21) Appl. No.: 15/569,182

(22) PCT Filed: May 9, 2016

(86) PCT No.: PCT/JP2016/002268
§ 371 (c)(1),
(2) Date: Oct. 25, 2017

(87) PCT Pub. No.: WO2016/181643
PCT Pub. Date: Nov. 17, 2016

(65) Prior Publication Data
US 2018/0147764 A1 May 31, 2018

(30) Foreign Application Priority Data
May 11, 2015 (JP) .................. 2015-096860

(51) Int. Cl.
*B29C 45/66* (2006.01)
*B22D 17/26* (2006.01)
*B29C 33/22* (2006.01)

(52) U.S. Cl.
CPC ............. *B29C 45/66* (2013.01); *B22D 17/26* (2013.01); *B22D 17/263* (2013.01); *B29C 33/22* (2013.01);
(Continued)

(58) Field of Classification Search
CPC .............. B29C 45/66; B29C 2045/664; B29C 2045/686; B29C 33/22; B22D 17/263
See application file for complete search history.

(56) References Cited

U.S. PATENT DOCUMENTS 3,606,641 A * 9/1971 Carrieri et al. ...... B29C 45/6707
425/192 R
3,669,599 A * 6/1972 Snider et al. ....... B29C 45/1751
425/595
(Continued)

FOREIGN PATENT DOCUMENTS

CN 102470592 A 5/2012
CN 102873814 A 1/2013
(Continued)

OTHER PUBLICATIONS

Office Action for Chinese Application No. 201680021150.8 dated Dec. 5, 2018; 20pp.
(Continued)

*Primary Examiner* — James P Mackey
(74) *Attorney, Agent, or Firm* — Kanesaka Berner and Partners, LLP

(57) ABSTRACT

Provided is a mold opening/closing device that can prevent a ball screw shaft from reaching a risky speed while using a ball screw having a cantilever supporting structure. A mold clamping device according to the present invention is provided with: a ball screw having a ball screw shaft and a ball screw nut that meshes with the ball screw shaft; and a motor that drives the ball screw. One end of the ball screw shaft is supported by a fixation plate or a movable plate so as to be rotatable or non-rotatable, while being restricted in movement in an axial direction and thereby serving as a fixed end, and the other end thereof serves as a free end. Further, the mold clamping device is characterized in that a distance
(Continued)

between the ball screw nut and the fixed end is shorter than a distance between the fixed plate and the movable plate.

19 Claims, 11 Drawing Sheets

(52) U.S. Cl.
CPC .. *B29C 2045/664* (2013.01); *B29C 2045/665* (2013.01)

(56) References Cited

U.S. PATENT DOCUMENTS

| | | | | |
|---|---|---|---|---|
| 4,984,980 | A * | 1/1991 | Ueno | B29C 45/1761 |
| | | | | 164/341 |
| 5,192,557 | A * | 3/1993 | Hirata | B29C 45/1761 |
| | | | | 425/450.1 |
| 6,179,607 | B1 * | 1/2001 | Inaba | B29C 45/66 |
| | | | | 425/451.7 |
| 6,561,785 | B1 | 5/2003 | Morita et al. | |
| 6,851,942 | B2 * | 2/2005 | Wohlrab | B29C 45/68 |
| | | | | 425/190 |
| 9,254,600 | B2 * | 2/2016 | Fujita | B29C 45/66 |
| 2012/0034330 | A1 | 2/2012 | Fujita et al. | |

FOREIGN PATENT DOCUMENTS

| JP | 62-3917 | * | 1/1987 |
|---|---|---|---|
| JP | 5-84766 | * | 4/1993 |
| JP | 9-141717 | * | 6/1997 |
| JP | 2001-191377 A | | 7/2001 |
| JP | 3206889 B2 | | 9/2001 |
| JP | 2002-154146 A | | 5/2002 |
| JP | 2002-192585 A | | 7/2002 |
| JP | 4323900 B2 | | 9/2009 |
| JP | 4516097 B2 | | 8/2010 |

OTHER PUBLICATIONS

Written Opinion of the International Searching Authority in PCT/JP2016/002268, dated Jul. 5, 2016. 8pp.

International Search Report in PCT/JP2016/002268, dated Jul. 5, 2016. 2pp.

Koh Masuda, "Kenkyusha's New Japanese-English Dictionary", Fourth Edition, p. 1501, Published by Kenkyusha Ltd., Tokyo, Japan; 1991; 3pp.

Okayama Prefectural Kurashiki Amaki Senior High School, "Basic Japanese-English Physics Vocabulary with English Definitions", Jul. 2014, Okayama-ken, Japan; 47 pp.

Unruh, W.G., "Modes of Vibration", UBC Theoretical Physics Homepage. University of British Columbia. http://www.theory.physics.ubc.ca/341-current/modes.pdf, last checked Oct. 10, 2019 ; pp. 1-5; 5pp.

Jim Hetrick, "Waves and Modes", University of Michigan—Dearborn; http://wwwpersonal.umd.umich.edu/~jameshet/IntroLabs/IntroLabDocuments/150-12%20Waves/Waves%209.0.pdf, last checked Oct. 10, 2019 ; pp. 1-12; 12pp.

* cited by examiner

MOLD OPENING/CLOSING DEVICE

RELATED APPLICATIONS

The present application is National Phase of International Application Number PCT/JP2016/002268, filed May 9, 2016, and claims priority based on Japanese Patent Application No. 2015-096860, filed May 11, 2015.

TECHNICAL FIELD

The present invention relates to a mold opening/closing device that constitutes a mold clamping device which is applied to an injection molding machine, a die casting machine, and the like.

BACKGROUND ART

A mold clamping device of a double platen-type injection molding machine is provided with two elements, one being a mold clamping mechanism and the other being a mold opening/closing mechanism. Usually, mold closing is performed by a movable plate at a position that is away from a fixation plate being moved toward the fixation plate by the mold opening/closing mechanism, and then the mold clamping mechanism performs mold clamping at a predetermined pressure on the fixation plate and the movable plate mechanically coupled with the fixation plate. Once one shot of injection molding is over, the mold clamping by the mold clamping mechanism is released, and then mold opening is performed by the mold opening/closing mechanism moving the movable plate away from the fixation plate.

PTL 1 discloses a mold clamping device that is provided with a mold opening/closing mechanism which is provided with a mold clamping mechanism performing mold clamping after mold closing by allowing a fixation plate and a movable plate to be coupled with each other and a pair of ball screws driven by a pair of motors in a double platen-type injection molding machine including the fixation plate and the movable plate. In the mold opening/closing mechanism according to PTL 1, both ends of a screw shaft of the ball screw are rotatably supported by a cradle and a ball screw nut is fixed to the movable plate. In other words, the ball screw shaft in the mold opening/closing mechanism according to PTL 1 is supported at three points, including the ball screw nut.

In the mold opening/closing mechanism according to PTL 1, the both ends of the screw shaft of the ball screw are supported by the cradle and each of the ball screws is installed at a low position of the movable plate. Accordingly, the point of driving by the ball screw is a low position of the movable plate. Accordingly, during mold opening/closing movements, the high site of the movable plate is subject to a delay in movement in comparison to the low site due to inertia and the accuracy of the degree of parallelism between the fixation plate and the movable plate falls in some cases. In addition, the driving resultant force of each of the ball screws of the mold opening/closing mechanism does not pass through the center of gravity of the movable plate or the vicinity of the center of gravity, and thus a large-capacity and expensive ball screw has to be applied in some cases for the ball screw to be capable of enduring the bending moment generated in a drive shaft of the ball screw due to the inertial force of the movable plate.

As an example of countermeasures related thereto, one of the pair of ball screws may be disposed at a high position with the other one of the ball screw disposed at a low position across the center of gravity of the movable plate or the vicinity of the center of gravity. At least the ball screw that is disposed at the high position is away from the cradle, and thus a structure for supporting both ends is unlikely to be obtained, even if one supporting end of the ball screw is fixed to the movable plate or the fixation plate, due to the lack of a member fixing the other supporting end in the case of the double-platen structure mold clamping device as in PTL 1. This results in the adoption of a supporting structure in which only one end of the ball screw shaft is supported by the movable plate or the fixation plate and the other end is a free end. The ball screw that is disposed at the high position is weak in terms of supporting rigidity because the degree of freedom of an attachment space is low and it is an attachment structure at the high position, and thus reduction in size and weight is required. A supporting structure in which one end of a screw shaft of a mold opening/closing mechanism is supported by a fixation plate and the other end is a free end is disclosed in, for example, PTL 2. The supporting structure according to PTL 2 relates to a three platen-type mold clamping device, and the side of the screw shaft that is close to the free end is supported by a nut member fixed to a connection board. In other words, the supporting structure in which one end of the screw shaft is supported and the other end is a free end is supported at two points, including the nut member. This supporting structure will be referred to as a cantilever supporting structure below.

In the case of the cantilever supporting structure that is disclosed in PTL 2, the slenderness ratio of the ball screw shaft increases because the length from the one end portion of the ball screw shaft that is supported to the nut member is large or in a case where the diameter of the ball screw shaft is small for reduction in weight. For this reason, the ball screw shaft is likely to swing, and a risky speed is reached in some cases depending on operation conditions. Accordingly, in some cases, the degree of freedom of the upper allowable value of the moving speed of the movable plate by the ball screw is limited.

CITATION LIST

Patent Literature

[PTL 1] Japanese Unexamined Patent Application Publication No. 2002-154146
[PTL 2] Japanese Patent No. 3206889

SUMMARY OF INVENTION

Technical Problem

An object of the present invention is to provide a mold opening/closing device that is capable of preventing a ball screw shaft from reaching a risky speed while using a ball screw that has a cantilever supporting structure.

Solution to Problem

A mold opening/closing device according to the present invention, which is based on the object, moves a movable plate holding a movable mold forward and backward with respect to a fixation plate holding a fixed mold. The mold opening/closing device includes a ball screw mechanism having a ball screw shaft and a ball screw nut meshing with the ball screw shaft, and a motor driving the ball screw mechanism.

According to the present invention, one end side of the ball screw shaft is a fixed end by being rotatably or non-rotatably supported by the fixation plate or the movable plate with its movement in an axial direction restricted. The other end side is a free end. In other words, the ball screw shaft according to the present invention forms a cantilever supporting structure.

In the mold opening/closing device according to the present invention, a gap D1 between the ball screw nut and the fixed end is narrower than a gap D2 between the fixation plate and the movable plate.

The mold opening/closing device according to the present invention includes at least two aspects so that the gap D1 between the ball screw nut and the fixed end is narrower than the gap D2 between the fixation plate and the movable plate.

The first aspect is the ball screw nut being placed between the fixation plate and the movable plate in part or in whole.

The second aspect is the fixed end of the ball screw shaft being placed between the fixation plate and the movable plate.

In addition, the mold opening/closing device according to the present invention includes the following four aspects in response to the placement of a supporting portion of the ball screw shaft that is rotatable or non-rotatable.

The first aspect is that the fixed end of the ball screw shaft is rotatably supported by the fixation plate, the ball screw nut is non-rotatably supported by the movable plate, and the electric motor is disposed on the fixation plate and allows the ball screw shaft to be driven to rotate.

The second aspect is that the fixed end of the ball screw shaft is rotatably supported by the movable plate, the ball screw nut is non-rotatably supported by the fixation plate, and the motor is disposed on the movable plate and allows the ball screw shaft to be driven to rotate.

The third aspect is that the fixed end of the ball screw shaft is non-rotatably supported by the movable plate, the ball screw nut is rotatably supported by the fixation plate, and the motor is disposed on the fixation plate and allows the ball screw nut to be driven to rotate.

The fourth aspect is that the fixed end of the ball screw shaft is non-rotatably supported by the fixation plate, the ball screw nut is rotatably supported by the movable plate, and the motor is disposed on the movable plate and allows the ball screw nut to be driven to rotate.

In the first and second aspects, it is preferable that the supporting member non-rotatably fixing the ball screw nut is lower in flexural rigidity than the ball screw shaft.

In the third and fourth aspects, it is preferable that the supporting member non-rotatably fixing the fixed end of the ball screw shaft is lower in flexural rigidity than the ball screw shaft.

In the mold opening/closing device according to the present invention, it is preferable that at least two mold opening/closing devices are placed at symmetrical positions in front view of the movable plate and the fixation plate. It is particularly preferable that one of the mold opening/closing devices is placed at a relatively low position, the other one of the mold opening/closing devices is placed at a relatively high position, and the one mold opening/closing device and the other mold opening/closing device are placed at diagonal positions. At this time, it is preferable that the pair of mold opening/closing devices is symmetrically placed with respect to a middle portion including the vicinity of a center-of-gravity point of a movable member including the movable plate.

It is preferable that the mold opening/closing device according to the present invention further includes a screw shaft sliding member allowing insertion and withdrawal of the ball screw shaft at a site where the ball screw shaft is supported by the ball screw nut and on the free end side near the ball screw nut, the screw shaft sliding member slidably supporting the screw shaft during the insertion. The ball screw shaft is withdrawn from the sliding member when the movable plate is opened. When the movable plate is closed, the ball screw shaft is slidably supported after being inserted into the sliding member.

In this case, it is preferable that a gap between the ball screw nut and the screw shaft sliding member is set such that it does not coincide with an inter-belly gap or an inter-section gap in at least one vibration mode at a natural frequency of the ball screw shaft. Then, a plurality of supporting sites supporting the ball screw shaft is placed such that it is not present at the positions of the belly or the section of the vibration at the same time even if the movable plate moves. At this time, the screw shaft sliding member may be disposed at a plurality of sites so that the setting of the inter-belly gap or the inter-section gap in the one or plurality of vibration modes not to coincide with the gap between the ball screw nut and the screw shaft sliding member is facilitated. In this case, the gap between the plurality of screw shaft sliding members may be constant or different in accordance with the vibration mode to be suppressed.

In addition, it is preferable that the gap between the ball screw nut and the screw shaft sliding member is set such that it does not coincide with the inter-belly gap or the inter-section gap in at least one of primary to tertiary vibration modes at the natural frequency of the ball screw shaft.

Furthermore, it is preferable that an axial length of any one or each of the ball screw nut and the screw shaft sliding member is set such that it simultaneously contains the inter-belly gaps or the inter-section gaps in at least two different ones of the primary to tertiary vibration modes at the natural frequency of the ball screw shaft. Specifically, it is preferable that the axial length of the ball screw nut or the screw shaft sliding member is set such that, for example, it is at least equal to the relative distance from the position of the belly of the primary vibration mode to the position of the belly of the secondary vibration mode.

In the mold opening/closing device according to the present invention, a position of a central axis of the screw shaft sliding member can deviate from a position of a central axis of the supporting portion of the ball screw shaft or deviate from a position of a central axis of the ball screw nut.

In the mold opening/closing device according to the present invention, an inner diameter of the screw shaft sliding member can be equal to an outer diameter of the ball screw shaft or smaller than the outer diameter.

Advantageous Effects of Invention

According to the mold opening/closing device of the present invention, the ball screw shaft has the cantilever supporting structure, and thus no supporting member is required for a cradle. Accordingly, at least one of the mold opening/closing devices can be disposed at the high position of the mold opening/closing device separated from the cradle. Accordingly, a load from the mold opening/closing device to the movable plate can be uniform in a height direction, and thus it becomes unnecessary to apply a large-capacity and expensive ball screw as a measure against the bending moment that is attributable to the inertial force of the movable plate and a decline in the accuracy of the degree of parallelism between the fixation plate and the movable plate during mold opening/closing operations can be prevented.

In the mold opening/closing device according to the present invention, the gap of the supporting portion of the mold opening/closing device can be a minimum one that is required since the gap D1 between the ball screw nut and the fixed end is narrower than the gap D2 between the fixation plate and the movable plate. As a result, the risky speed region of the ball screw is shifted to a higher speed region, and thus the risky speed of the ball screw can be in the higher speed region even in a case where the ball screw shaft is used with a high slenderness ratio. Accordingly, the upper limit of the mold opening/closing speed that ensures safe driving can be raised with ease, and higher-cycle molding can be performed. Alternatively, the cost of the ball screw can be lowered by the ball screw shaft being made thinner without any change in the mold opening/closing speed.

The diameter of the ball screw can be reduced with ease by the use of a ball screw shaft with a low slenderness ratio being allowed, and thus the responsiveness and control accuracy of the mold opening/closing operation can be improved through reduction in the rotational inertia of the ball screw resulting from the easier ball screw diameter reduction.

Since the sliding member supporting the ball screw shaft is disposed on the free end side of the ball screw shaft near the ball screw nut, the cantilever length on the free end side of the ball screw shaft can be reduced. Accordingly, the risky speed of the ball screw can be raised and effects similar to the above can be achieved.

The rigidity of the supporting member non-rotatably fixing the ball screw nut or the rigidity of the supporting member non-rotatably fixing the fixed end of the ball screw shaft is lower than that of the ball screw shaft, and thus the bending moment attributable to the inertial force of the movable plate or the like is absorbed by a deformation of the supporting member. Accordingly, the bending moment that is attributable to, for example, the inertial force of the movable plate acting on the ball screw nut or the ball screw shaft can be reduced and damage to the ball screw can be prevented.

BRIEF DESCRIPTION OF DRAWINGS

FIG. 3A shows a state where a movable plate has approached a fixation plate. FIG. 3B shows a state where the movable plate is away from the fixation plate.

FIG. 8A shows how a free end E2 of the ball screw shaft is bent upwards in a vertical direction. FIG. 8B shows a solution example related thereto. FIG. 8C shows how the free end E2 of the ball screw shaft is bent downwards in the vertical direction or in a horizontal direction. FIG. 8D shows a solution example related thereto.

DESCRIPTION OF EMBODIMENTS

Hereinafter, embodiments of the present invention will be described in detail with reference to accompanying drawings.

First Embodiment

Figure 1:
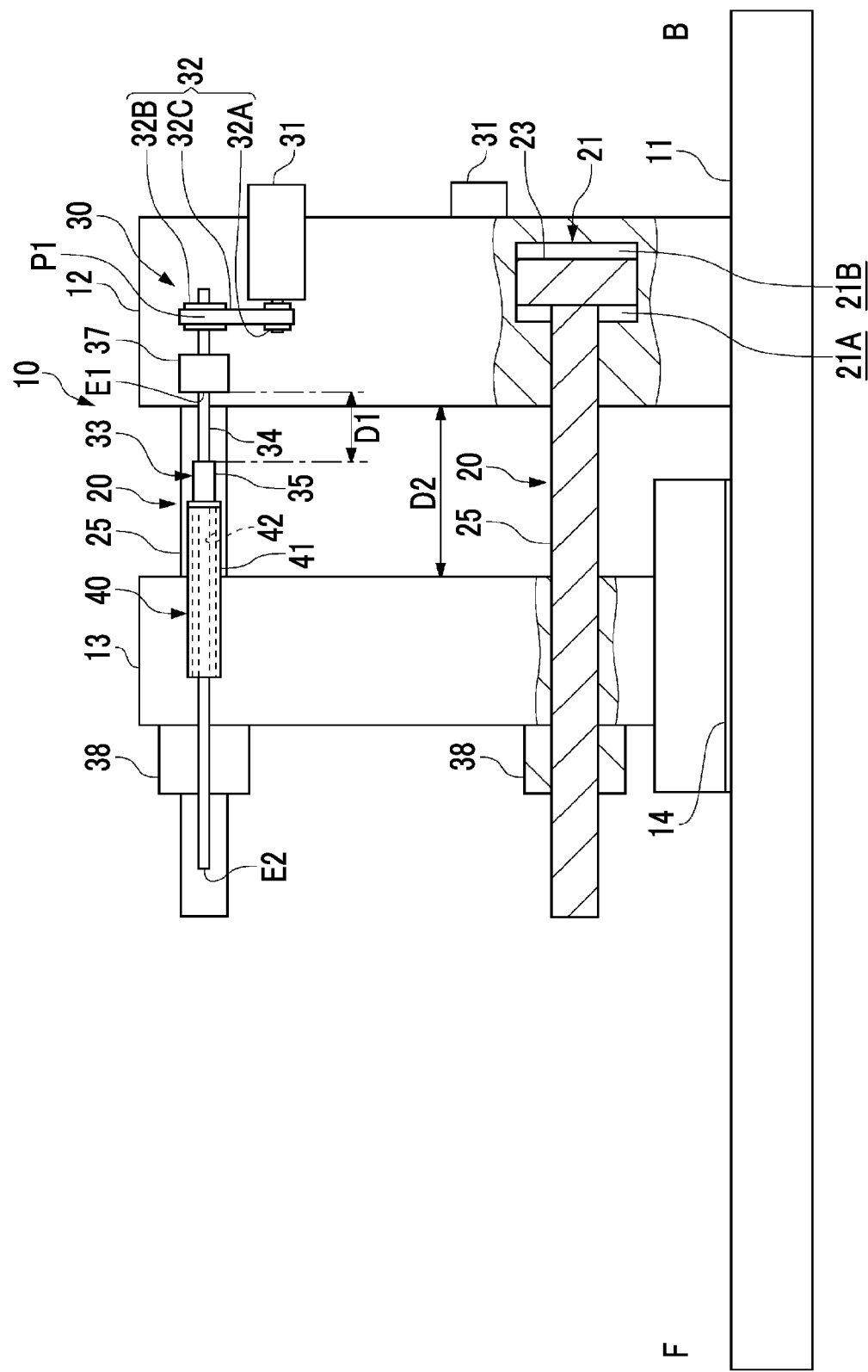
FIG. 1 is a partial sectional view illustrating a schematic configuration of a mold clamping device according to a first embodiment of the present invention.

In a mold clamping device 10, a fixation plate 12 holding a fixed mold (not illustrated) is fixed to one end side of a cradle 11 as illustrated in FIG. 1.

A movable plate 13 holding a movable mold (not illustrated) and facing the fixation plate 12 is disposed on the cradle 11 to be capable of moving forward and backward in a front-back direction. The movable plate 13 is provided with, for example, a guide rail and a sliding plate between the cradle 11 and itself. The movable plate 13 is fixed to an upper portion of a sliding member 14 sliding on the cradle 11 in the front-back direction and performs a reciprocating movement together with the sliding member 14. The present embodiment will be described below with the side where the fixation plate 12 is disposed defined as the front (B in the drawing) and the side where the movable plate 13 is disposed defined as the back (F in the drawing).

As illustrated in FIG. 1, the mold clamping device 10 is provided with a mold clamping mechanism 20 and a mold opening/closing mechanism (mold opening/closing device) 30. The mold clamping device 10 clamps the movable mold and the fixed mold with a predetermined mold clamping force by means of the mold clamping mechanism 20 after the movable mold abuts against the fixed mold by the movable plate 13 being moved forward by the mold opening/closing mechanism 30. Then, the mold clamping by the mold clamping mechanism 20 is released once a mold cavity is filled with a molten resin and a molded article is completely cooled and solidified. Subsequently, mold opening is performed by the movable mold being moved backward by the mold opening/closing mechanism 30.

The mold clamping mechanism 20 is provided with a hydraulic cylinder 21 as a driving source. The mold clamping mechanism 20 performs the mold clamping by driving a tie bar 25 with this hydraulic cylinder 21. The mold clamping mechanism 20 is disposed at each of the four corners of the fixation plate 12 and the movable plate 13.

Figure 2A:
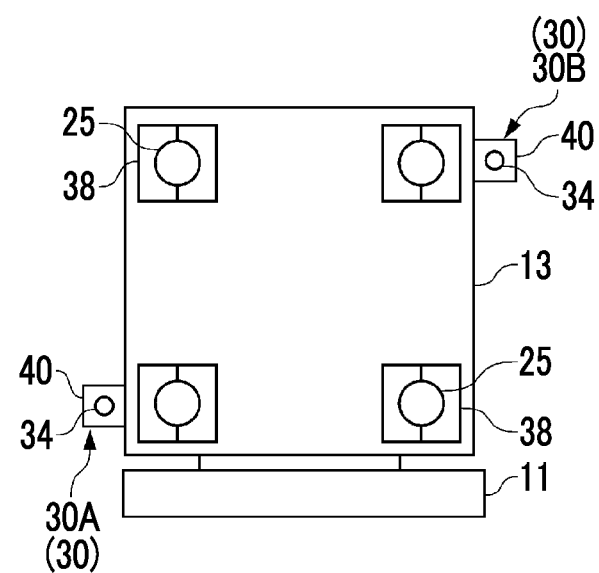
FIGS. 2A-2C are schematic diagrams illustrating a configuration of a front surface of the mold clamping device illustrated in FIG. 1.
Figure 2B:
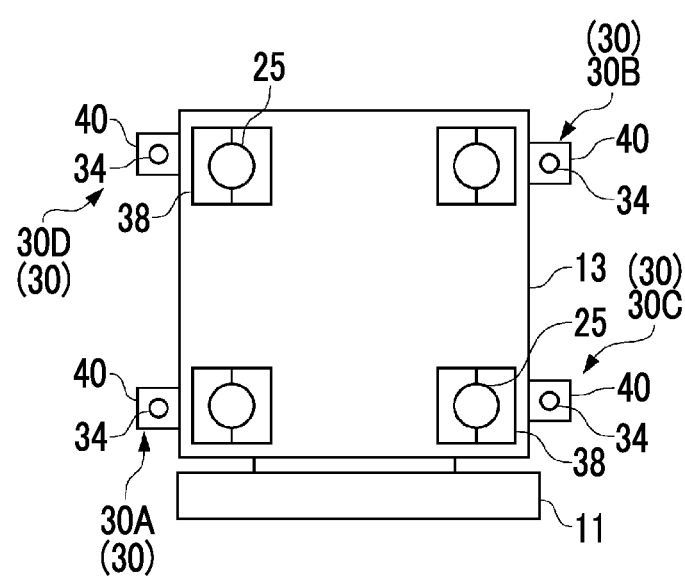

As illustrated in FIGS. 1, 2A and 2B, each of the tie bars 25 is a member connecting the fixation plate 12 and the movable plate 13 to each other in the front-back direction and a plurality of ring-shaped ridge portions is disposed on its back side. During the mold clamping, the plurality of ring-shaped ridge portions passes through the movable plate 13 and is engaged with a plurality of ring-shaped groove portions of a half-split nut 38 disposed on the movable plate 13. A front end of the tie bar 25 is fixed to a ram 23 of the hydraulic cylinder 21 through the fixation plate 12. The tie bar 25 is moved in the direction opposite to the movable plate 13 as a result of hydraulic fluid supply to a first hydraulic chamber 21A of the hydraulic cylinder 21 and hydraulic fluid discharge from a second hydraulic chamber 21B. As a result, the mold clamping is performed with the movable plate 13 moved by pulling toward the fixation plate 12 via the half-split nut 38.

The mold opening/closing mechanism 30 performs opening/closing of the movable plate 13 by driving a ball screw 33 with a motor 31. The present embodiment is characterized by adopting a structure that reduces the distance between a fixed supporting end and a ball screw nut 35 with a ball screw shaft 34 of the mold opening/closing mechanism 30 cantilever-supported as illustrated in FIG. 1. The present embodiment is also characterized by a nut supporting member 40 protruding toward the fixation plate 12 from the movable plate 13 and a gap D1 between the ball screw nut 35 and a screw bearing 37 that supports the ball screw shaft 34 being disposed as a gap narrower than a gap D2 between the fixation plate 12 and the movable plate 13 by the ball screw nut 35 being fixed to the nut supporting member 40. The present embodiment is also characterized by two units of the mold opening/closing mechanism 30 (30A and 30B) being placed at positions symmetrical to each other, diagonal positions to be more specific, in front view of the mold clamping device 10 as illustrated in FIG. 2A. Some elements such as the motor 31 are not illustrated in FIG. 2A.

As illustrated in FIG. 1, the ball screw 33 of the mold opening/closing mechanism 30 is provided with the ball screw shaft 34 and the ball screw nut 35 meshing with the ball screw shaft 34. One end side of the ball screw shaft 34 that is positioned on the right side in FIG. 1 is a fixed end E1 rotatably supported by the screw bearing 37, and the other end side that is positioned on the left side in the drawing is a free end E2. The ball screw shaft 34 is restricted so that it cannot be moved in an axial direction.

The ball screw nut 35 meshes with the ball screw shaft 34 between the fixed end E1 and the free end E2. The ball screw nut 35 is fixed to and supported by the nut supporting member 40 fixed to the movable plate 13. The nut supporting member 40 is provided with a supporting cylinder 41 and a screw shaft accommodating chamber 42, which is a pore penetrating the supporting cylinder 41 in the axial direction.

The nut supporting member 40 is placed such that the axial direction of the supporting cylinder 41 coincides with the front-back direction of the mold clamping device 10. The nut supporting member 40 protrudes toward the fixation plate 12 from the movable plate 13 with its one end portion fixed to a side surface of the movable plate 13 and the other end portion placed between the movable plate 13 and the fixation plate 12. Accordingly, on the premise of the stroke of the same movable plate 13, an operation stroke end of the ball screw nut 35 approaches the fixed end E1 side of the ball screw shaft 34 to the same extent as the nut supporting member 40 fixed to the side surface of the movable plate 13 protrudes toward the fixation plate 12. As a result, a useless region that does not constitute the effective stroke of the ball screw nut 35 on the ball screw shaft 34 can be shortened, and thus the total length of the ball screw shaft 34 can be reduced.

The screw shaft accommodating chamber 42 of the nut supporting member 40 has an opening diameter that slightly exceeds the outer diameter of the ball screw shaft 34 of the ball screw 33. The ball screw shaft 34 is inserted into the screw shaft accommodating chamber 42 without touching the supporting cylinder 41.

The ball screw nut 35 that meshes with the ball screw 33 is fixed to the end portion of the nut supporting member 40 on the fixation plate 12 side such that its central axis coincides with that of the supporting cylinder 41. In other words, the ball screw 33 is a type of ball screw in which the ball screw shaft 34 rotates (is rotatable) whereas the ball screw nut 35 does not rotate (is non-rotatable). Accordingly, forward and reverse rotation of the ball screw shaft 34 results in a linear reciprocating motion of the ball screw nut 35 and the nut supporting member 40, to which the ball screw nut 35 is fixed, in the front-back direction. This, in turn, results in a linear reciprocating motion of the movable plate 13. Then, the mold opening/closing are conducted.

The ball screw nut 35, which is fixed to the end portion of the nut supporting member 40 on the fixation plate 12 side, is placed between the fixation plate 12 and the movable plate 13. Only a part or the whole of the ball screw nut 35 in the axial direction may be placed between the fixation plate 12 and the movable plate 13.

The mold opening/closing mechanism 30 has the motor as a driving source for the ball screw 33, and the motor 31 is fixed to a side surface of the fixation plate 12. The rotational output of the motor 31 is transmitted to the ball screw shaft 34 via a transmission mechanism 32, which consists of pulleys 32A and 32B and a belt 32C.

The mold clamping device 10 is provided with the two mold opening/closing mechanisms 30. As illustrated in FIG. 2A, the mold opening/closing mechanism 30A, which is one of the two, is placed at a lower part on a left side surface in front view and the mold opening/closing mechanism 30B, which is the other one of the two, is placed at an upper part on a right side surface. The mold opening/closing mechanisms 30A and 30B are used for one of the two to be distinguished from the other. In a case where the mold opening/closing mechanisms 30A and 30B are collectively referred to, the mold opening/closing mechanisms 30A and 30B will be simply referred to as the mold opening/closing mechanism 30 as before.

The two mold opening/closing mechanisms 30A and 30B perform the mold opening/closing by moving the movable plate 13 so that it approaches the fixation plate 12 or moving the movable plate 13 away from the fixation plate 12 by being operated in synchronization with each other.

Mold opening/closing operations by the use of the mold opening/closing mechanism 30 will be described with reference to FIGS. 3A-3B.

Figure 3A:
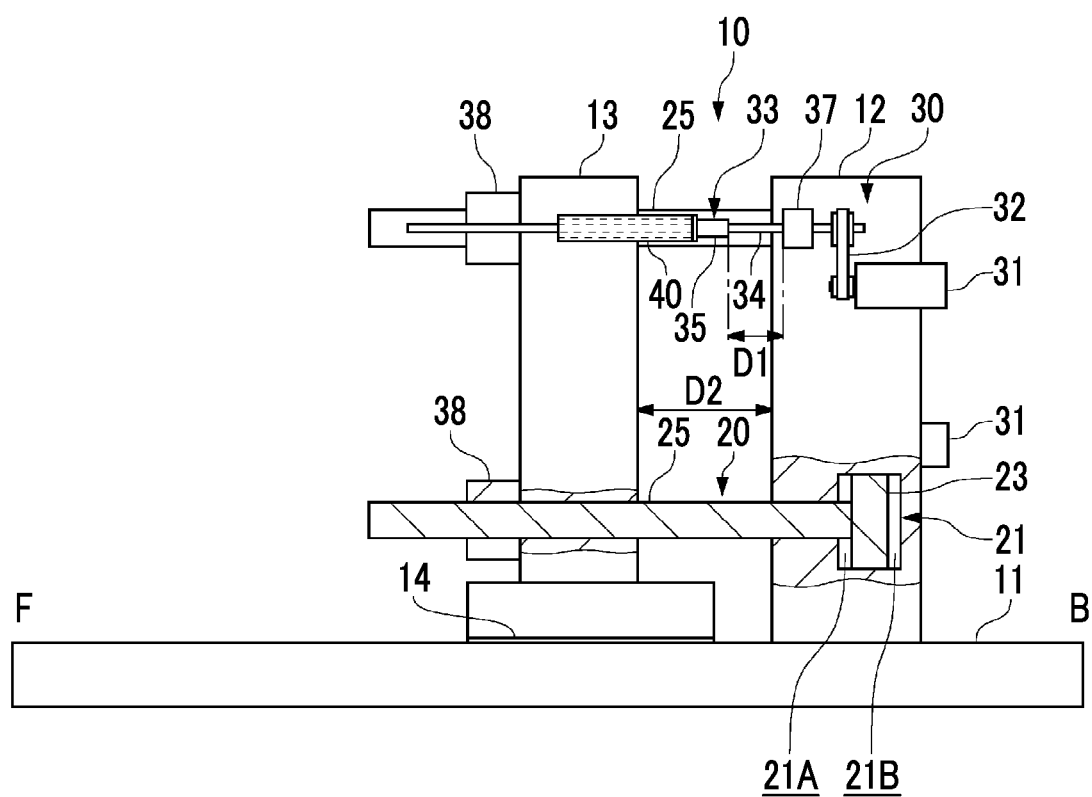
FIGS. 3A and 3B show the mold clamping device illustrated in FIG. 1.
Figure 3B:
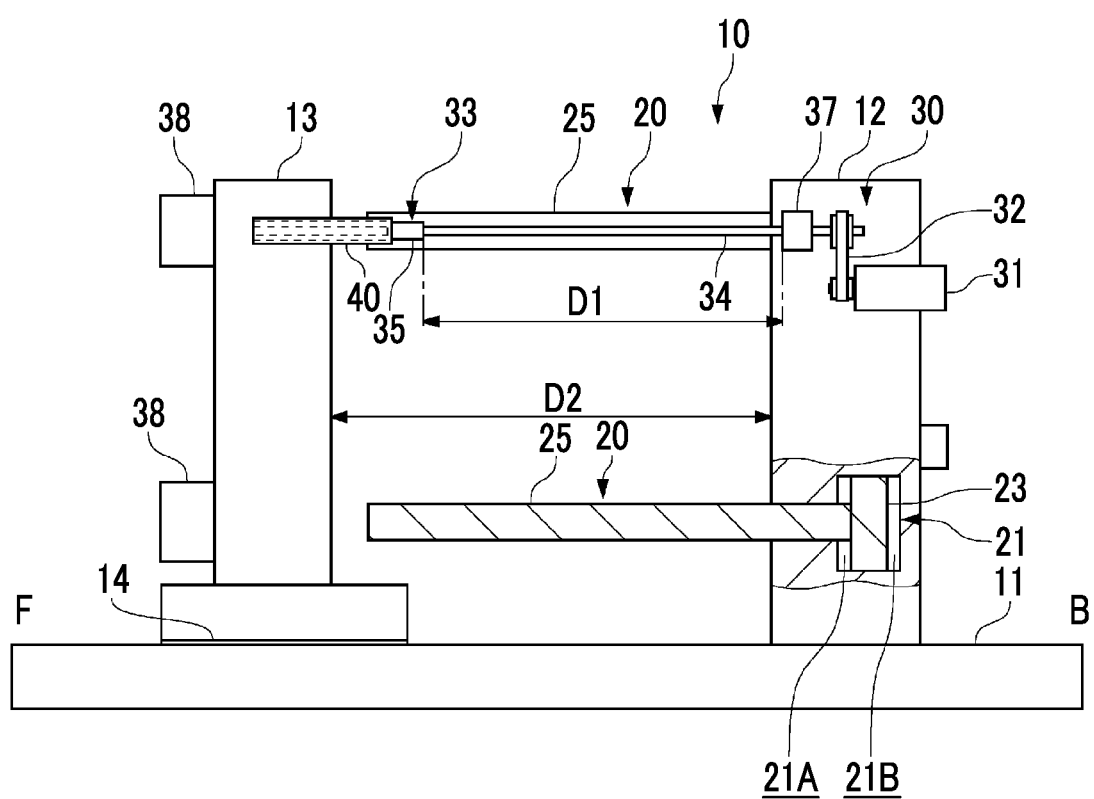

The mold opening/closing mechanism 30 performs the mold opening/closing operations by moving the movable plate 13 between the position that is illustrated in FIG. 3A and the position that is illustrated in FIG. 3B. The movable plate 13 is close to the fixation plate 12 at the former position of the movable plate 13, and the movable plate 13 is away from the fixation plate 12 at the latter position of the movable plate 13.

The mold closing operation starts from, for example, the state that is illustrated in FIG. 3B. In this state, the movable plate 13 is away from the fixation plate 12 with the fixed mold (not illustrated) attached to the fixation plate 12 and the movable mold (not illustrated) attached to the movable plate 13.

The respective motors 31 of the mold opening/closing mechanisms 30A and 30B (FIG. 2A) are driven for the mold opening/closing operations to be performed. This leads to rotation (forward rotation or reverse rotation) of the ball screw shaft 34. Nonetheless, rotation of the ball screw nut 35 meshing with the ball screw shaft 34 is restricted, and thus the ball screw nut 35 and the nut supporting member 40 are loaded with thrust in the direction approaching the fixation plate 12 or in the direction away from the fixation plate 12. Because of this thrust, the movable plate 13 fixed to the nut supporting member 40 approaches the fixation plate 12 or is moved away from the fixation plate 12 and the mold closing or the mold opening is conducted.

The following effects are achieved by the mold clamping device 10 described above.

The mold opening/closing mechanism 30 according to the present embodiment has the cantilever supporting structure in which the ball screw shaft 34 is fixed at only one end. Accordingly, the other end of the ball screw shaft 34 can be attached to any position of the mold clamping device 10 in a height direction without having to be attached to the cradle 11. As a result, the mold opening/closing mechanism 30A can be disposed at a position of the mold clamping device 10 lower than the center of the movable plate 13 and the mold opening/closing mechanism 30B can be disposed at a position higher than the center of the movable plate 13 and diagonal to the mold opening/closing mechanism 30A across the center of gravity of the movable plate 13 as illustrated in FIG. 2A. Accordingly, the position of the load point of the resultant force that the movable plate 13 is loaded with from the mold opening/closing mechanisms 30A and 30B can be near the center of gravity of the movable plate 13. Therefore, a decline in the accuracy of the degree of parallelism between the fixation plate 12 and the movable plate 13 can be prevented during the mold opening/closing operations. In addition, the bending moment that is generated in the ball screw shaft 34 by the inertial force of the movable plate 13 acting on the center of gravity of the movable plate 13 can be suppressed, and thus measures do not have to be taken such as application of an expensive and large-capacity ball screw that has a high level of flexural rigidity.

The mold opening/closing mechanism 30 has the cantilever supporting structure in which the nut supporting member 40 protruding toward the fixation plate 12 is fixed to the movable plate 13 and the ball screw nut 35 is fixed to the nut supporting member 40. The gap D1 between the ball screw nut 35 and the screw bearing 37 supporting the ball screw shaft 34 is narrower than the gap D2 between the fixation plate 12 and the movable plate 13 and the distance between the two points of support is shorter than the total length of the ball screw shaft 34. As a result, the natural frequency of the ball screw shaft 34 can be heightened, and thus the rotation speed range of the ball screw shaft 34 that is used during the mold opening/closing operations is unlikely to reach a risky speed. At this time, it is preferable that the lead of the ball screw of the mold opening/closing mechanism 30 is maximized in the range that is allowable in terms of balance among required thrust, motor capacity, and ball screw shaft diameter. In doing so, the ball screw rotation speed for obtaining a desired mold opening/closing speed of the mold opening/closing mechanism 30 can be reduced, and thus reaching the risky speed can be avoided with ease despite the cantilever supporting structure.

Since the distance between the two points can be reduced, occurrence of buckling in the ball screw shaft 34 can be prevented. In other words, although the ball screw shaft 34 is loaded with a compressive stress due to the inertia of the movable plate 13 at a time of deceleration during the course of the movement of the movable plate 13 toward the fixation plate 12, the substantial slenderness ratio of the ball screw shaft 34 can be reduced and buckling can be prevented since the distance between the two points loaded with the compressive stress can be reduced.

In the present embodiment, the distance between the free end E2 and a rotational driving portion P1 of the ball screw shaft 34 illustrated in FIG. 1 and the distance between the rotational driving portion P1 and the fixed end E1 can be reduced, and thus the amplitude of vibration of the ball screw shaft 34 can be reduced and noise and an abnormal sound during the driving of the ball screw 33 can be reduced.

In the present embodiment, the nut supporting member 40 is disposed that allows the ball screw nut 35 to be fixed to its end face protruding toward the fixation plate 12 from the movable plate 13. Accordingly, the expensive ball screw shaft 34 can be shortened and the cost of the mold clamping device 10 can be lowered.

In the mold clamping device 10 that has been described above, the two mold opening/closing mechanisms 30A and 30B are disposed at the diagonal positions as illustrated in FIG. 2A. However, four mold opening/closing mechanisms 30A, 30B, 30C, and 30D can be disposed at the four corners as illustrated in FIG. 2B, too. In this case, the mold opening/closing mechanism 30A and the mold opening/closing mechanism 30B are diagonal to each other and the mold opening/closing mechanism 30C and the mold opening/closing mechanism 30D are diagonal to each other.

By the mold opening/closing mechanisms 30 being placed at the four corners as described above and synchronous control being performed thereon, opening can be performed with the posture of the movable plate 13 controlled by the ball screws 33 placed at the four corners such that a parallel posture is maintained in a case where a core back operation is performed during foam molding by the mold clamping device 10 separating the movable plate 13 from the fixation plate 12. Then, the core back operation can be realized with the degree of parallelism between the movable plate 13 and the fixation plate 12 maintained with a high level of accuracy. In addition, the core back can be performed with ease even in a case where the resin in the cavity has a small foaming force because the core back force can be increased by the number of the mold opening/closing mechanisms 30 being increased to four. Once the number of the mold opening/closing mechanisms 30 is increased, a large force can be exerted during a mold release operation, during which the mold is filled by the molten resin being injected, cooling is performed, and then the molded article is peeled off from the mold, and thus the molded article can be peeled off from the mold with ease even if each of the mold opening/closing mechanisms 30 is a small actuator that has a small capacity.

Although the mold clamping device 10 has the cantilever supporting structure for the two mold opening/closing mechanisms 30A and 30B, the lower mold opening/closing mechanism 30 that is closer to the cradle 11 may be replaced with a mold opening/closing mechanism that has a structure for supporting both ends by the use of the cradle 11 as disclosed in PTL 1. In other words, the characteristic configuration of the present invention may be applied to a mold opening/closing mechanism disposed at a high position unlikely to be supported by the cradle 11.

In this case, a method for high-rigidity supporting can be achieved with the lower mold opening/closing mechanism 30A supported by the cradle 11, and thus stability can be added to the mold opening/closing operations.

The lower one can be supported by the cradle 11, which is likely to ensure an attachment space with relative ease and has a high level of rigidity, and thus the mold opening/ closing mechanism 30A can be a heavyweight and large-capacity actuator that is large in size. In this case, sliding is performed while the weight of a sliding portion between the cradle 11 and a lower surface of the sliding member 14, that is, the movable plate 13 as a heavyweight object, is supported during the mold opening/closing operations of the movable plate 13, placement is performed near the sliding portion, which has the largest dynamic resistance, and the dynamic resistance force is directly received. Accordingly, the lower mold opening/closing mechanism 30A, which requires a larger driving force than the upper mold opening/closing mechanism 30B far from the sliding portion, can be a large-capacity actuator, and thus the mold opening/closing operations can be performed with stability.

In addition, the lower mold opening/closing mechanism 30A serves as a large-capacity actuator, mold opening/closing operation control for the mold opening/closing mechanism 30 serves as master-slave control, the mold opening/closing mechanism 30A that is capable of outputting a large driving force serves as master control, and the mold opening/closing mechanism 30B serves as slave control. Then, the mold opening/closing mechanism 30A can be in charge of the driving force of the mold opening/closing operation, and the mold opening/closing mechanism 30B can load the driving force of the mold opening/closing mechanism 30B as auxiliary thrust with the diagonal portion where a delay has occurred due to the inertia of the movable plate 13 and correct the delay. In doing so, the mold opening/closing operations can be performed with stability even if the driving force output by the two mold opening/closing mechanisms 30A and 30B is uneven, distribution to the lower mold opening/closing mechanism 30A as the large actuator is increased, and distribution to the upper mold opening/closing mechanism 30B is reduced. Accordingly, the mold opening/closing mechanism 30B can become further compact in size as the case may be.

In this case, in addition, it is preferable that the distance between the center of gravity of a movable member consisting of the sliding member 14 and the movable plate 13 and the upper mold opening/closing mechanism 30B that is smaller in size is longer than the distance between the center of gravity and the lower mold opening/closing mechanism 30A that is larger in size. In doing so, the moment force around the center of gravity can be increased based on the longer distance from the center of gravity even if the thrust of the upper mold opening/closing mechanism 30B is small, and thus balance is likely to be achieved with the moment force around the center of gravity by the lower large mold opening/closing mechanism 30A and the degree of parallelism between the movable plate 13 and the fixation plate 12 can be controlled with ease and a high level of accuracy.

Figure 2C:
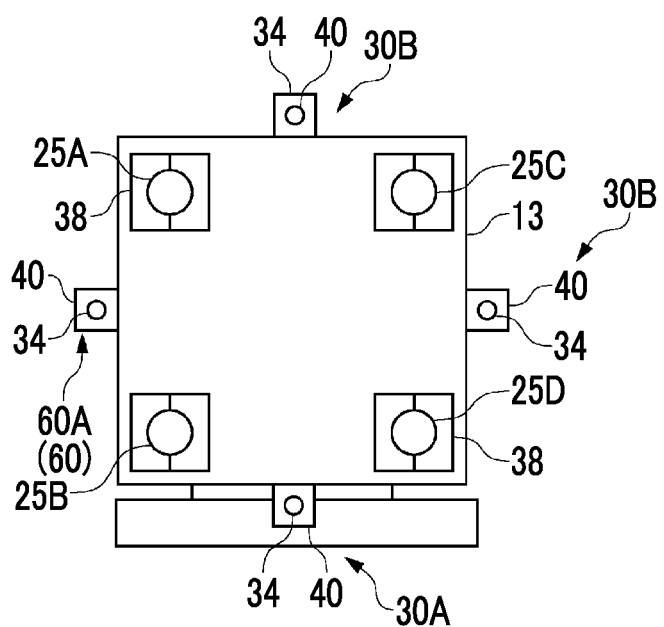

In the mold clamping device 10, the two mold opening/closing mechanisms 30A and 30B are placed at the diagonal positions as an example of the symmetrical positions. However, the symmetrical positions according to the present invention are not limited thereto. For example, the two mold opening/closing mechanisms 30A and 30B can also be placed at positions symmetrical to each other in the left-right direction in FIG. 2C at respective intermediate positions between tie bars 25A and 25B and tie bars 25C and 25D lining up with gaps in a vertical direction as illustrated in FIG. 2C. In the case of this placement, the mold is brought in between the movable plate 13 and the fixation plate 12 in the vertical direction between the tie bars 25A and 25C lining up in a horizontal direction. Alternatively, the two mold opening/closing mechanisms 30A and 30B can be placed at positions symmetrical to each other in the up-down direction in the drawing at respective intermediate positions between the tie bars 25A and 25C and the tie bars 25B and 25D lining up with gaps in the horizontal direction as illustrated in FIG. 2C. In this case, the mold is brought in from the space between the tie bars 25A and 25B lining up in the vertical direction to the space between the movable plate 13 and the fixation plate 12 in the horizontal direction. Both of these placements are capable of preventing an unstable movement and tilting of the movable plate 13 during the mold opening/closing movements. Even in these cases, it is preferable that the mold opening/closing mechanisms 30A and 30B and the mold opening/closing mechanisms 30C and 30D, which are diagonal to each other, are provided symmetrically such that the center of gravity of the movable plate 13 is interposed.

When it comes to the placement of the mold opening/closing mechanism 30, the mold for a large injection molding machine to which the double platen-type mold clamping device 10 is applied is brought in from the space between the tie bars 25A and 25B lining up in the vertical direction to the space between the movable plate 13 and the fixation plate 12 in the horizontal direction in many cases. Accordingly, it is preferable that the space between the tie bars 25 and 25 lining up in the vertical direction is an empty space. Accordingly, it is preferable that the two mold opening/closing mechanisms 30A and 30B are disposed at the diagonal positions as illustrated in FIGS. 2A and 2B.

In the mold clamping device 10, the motor 31 and the screw bearing 37 are fixed to the fixation plate 12 side and the nut supporting member 40 is fixed to the movable plate 13 side, and thus the motor 31, which is a heavyweight object, is placed on the fixation plate 12 and the movable plate 13, which is a moving body, does not become heavy. Accordingly, the motor 31 that is small in output will suffice. In addition, wiring for the motor 31 is facilitated because the motor 31 does not move. In addition, the opposite is also acceptable, that is, the motor 31 and the screw bearing 37 may be fixed to the movable plate 13 side with the nut supporting member 40 fixed to the fixation plate 12 side. In this form, the fixed end E1 of the ball screw shaft 34 is rotatably supported by the movable plate 13, the ball screw nut 35 is non-rotatably supported by the movable plate 13, and the motor 31 allows the ball screw shaft 34 to be driven to rotate.

In the form illustrated according to the first embodiment in which the motor 31 is placed on the fixation plate 12, the movable plate 13 as the moving body does not become heavy, and thus the motor 31 that is small in output will suffice and the inertia of the movable plate 13 can still be suppressed. In addition, wiring for the motor 31 is facilitated because the motor 31 does not move. These effects are achieved by the following second embodiment, too.

Second Embodiment

Hereinafter, a mold clamping device 50 according to the second embodiment of the present invention will be described with reference to FIGS. 4A and 4B. A mold opening/closing mechanism 60 of the mold clamping device 50 differs from the mold opening/closing mechanism 30 of the mold clamping device 10 according to the first embodiment in that the ball screw nut 35 rotates and the ball screw shaft 34 does not rotate in the former. The same reference numerals as in the first embodiment will be used in FIGS. 4A-4B to refer to components of the second embodiment identical to those of the first embodiment, and the following description will focus on differences between the first and second embodiments.

The mold opening/closing mechanism 60 performs opening/closing of the movable plate 13 by rotating the ball screw nut 35 with the motor 31. In the second embodiment, a structure is adopted that reduces the distance between a fixed supporting end and the ball screw nut 35 with the ball screw shaft 34 cantilever-supported and the two mold opening/closing mechanisms 30A and 30B are placed at diagonal positions as in the first embodiment.

One end side of the ball screw shaft 34 of the mold opening/closing mechanism 60 that is on the left side in the drawings is the fixed end E1 non-rotatably supported by the movable plate 13 via a screw shaft fixing member 61, and the other end side is the free end E2. The ball screw shaft 34 is restricted so that it cannot be moved in the axial direction.

The ball screw nut 35, which meshes with the ball screw shaft 34, is fixed to and supported by the end portion of the nut supporting member 40 on the movable plate 13 side, and the nut supporting member 40 is rotatably supported by a nut bearing 63 fixed to the fixation plate 12. The nut supporting member 40 protrudes toward the movable plate 13 from the fixation plate 12 with one of its end portions rotatably supported by the side surface of the fixation plate 12 and its end portion on the movable plate 13 side placed between the fixation plate 12 and the movable plate 13. A radial bearing that is provided with a plurality of rolling bodies, such as balls and rollers, and inner and outer rings that support the rolling bodies can be used as the nut bearing 63 with the outer ring fixed to the fixation plate 12 and the ball screw nut 35 supported by the inner ring.

The mold opening/closing mechanism 60 has the motor 31 as a driving source for the ball screw nut 35, and the motor 31 is fixed to the side surface of the fixation plate 12. The rotational output of the motor 31 is transmitted to the ball screw nut 35 via the transmission mechanism 32 similar to that of the embodiment described above.

In the mold opening/closing mechanism 60, the nut supporting member 40 that is fixed to the fixation plate protrudes toward the movable plate 13 and the ball screw nut 35 is fixed to its end portion on the movable plate 13 side. As a result, the gap D1 between the ball screw nut 35 and the screw shaft fixing member 61 is narrower than the gap D2 between the fixation plate 12 and the movable plate 13 as illustrated in FIGS. 4A and 4B and as in the first embodiment.

Once the motor 31 is driven during a mold opening/closing operation by the use of the mold opening/closing mechanism 60, the ball screw nut 35 rotates (this rotation being forward rotation). Nonetheless, rotation of the ball screw shaft 34 meshing with the ball screw nut 35 is restricted by the screw shaft fixing member 61, and thus the ball screw shaft 34 is loaded with thrust in the direction approaching the movable plate 13 (leftwards in the drawings). Because of this thrust, the movable plate 13 fixed to the ball screw shaft 34 via the screw shaft fixing member 61 is moved away from the fixation plate 12.

The mold opening/closing mechanism 60 described above has effects similar to the basic effects of the first embodiment. In the mold opening/closing mechanism described above, in addition, a lubricant such as grease applied to the ball screw shaft 34 is not scattered by rotation since the ball screw shaft 34 does not rotate.

With the motor 31 placed on the fixation plate 12, the movable plate 13, which is a moving body, does not become heavy. Accordingly, the motor 31 that is small in output will suffice while the inertia of the movable plate 13 can still be suppressed. In addition, wiring for the motor 31 is facilitated because the motor 31 does not move.

Because the screw bearing 37 rotatably supporting the ball screw nut 35, the motor 31, and a decelerator (not illustrated) are gathered, the mold opening/closing mechanism 30 can be modularized and assembly of the mold opening/closing mechanism 30 and work for exchange following the assembly can be facilitated.

Figure 5A:
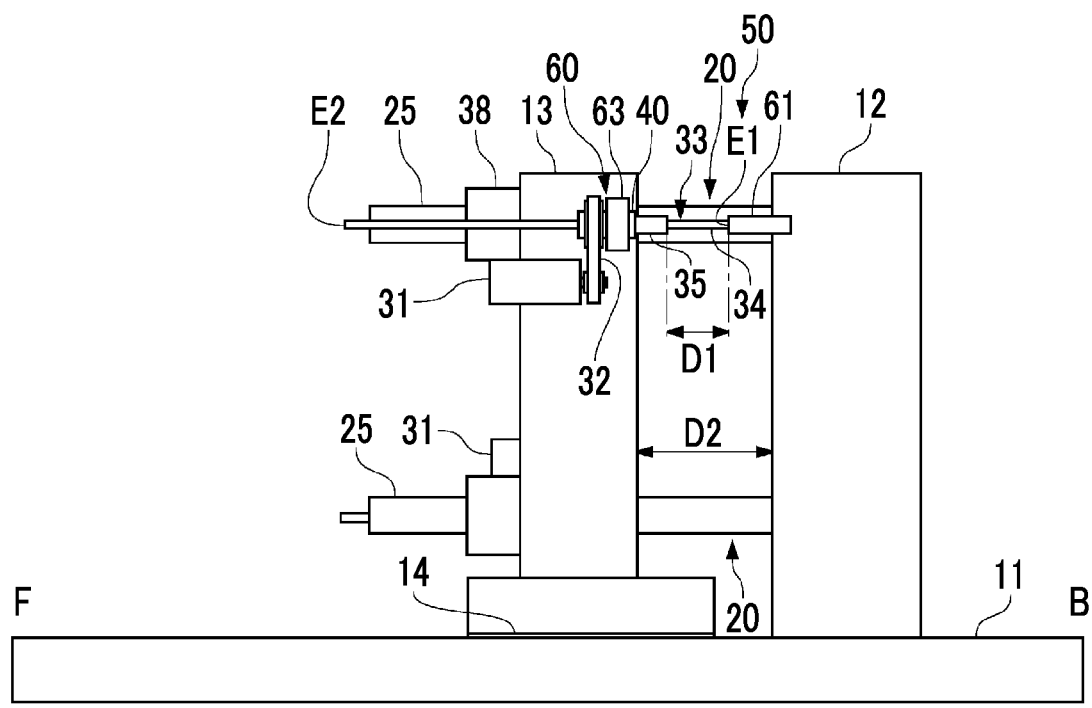
FIGS. 5A and 5B are diagrams illustrating a schematic configuration of a mold clamping device according to a modification example of the second embodiment of the present invention.
Figure 5B:
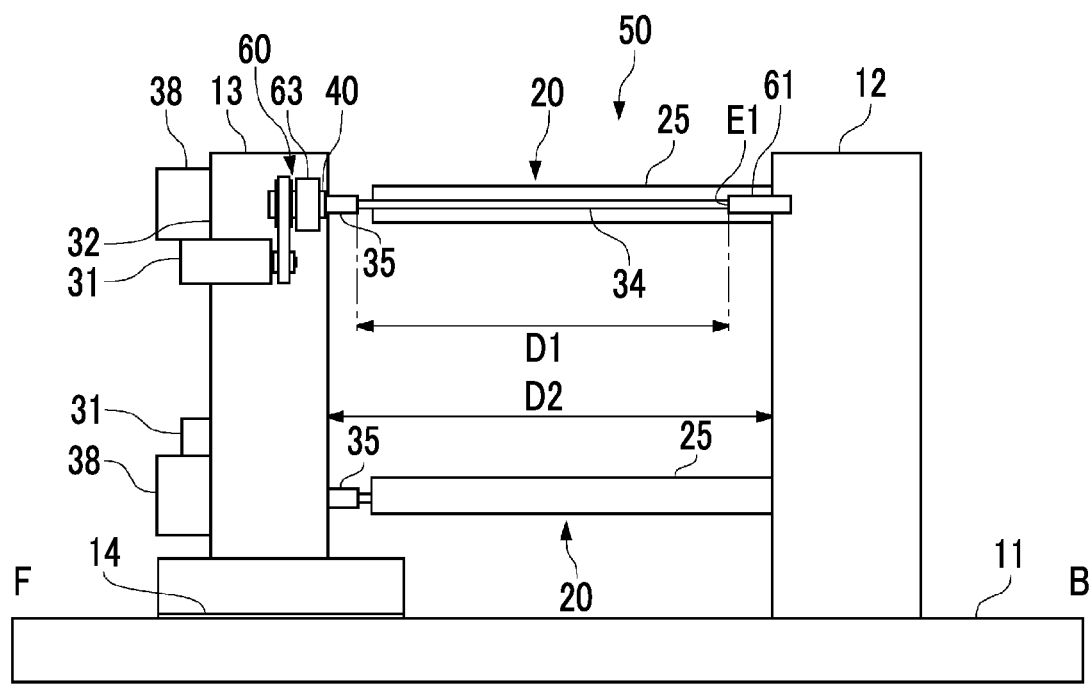

Also possible is the ball screw nut 35 being rotatably supported by the movable plate 13, the motor 31 that rotates the ball screw nut 35 being placed on the movable plate 13, and one shaft end of the ball screw shaft 34 being non-rotatably fixed to the fixation plate 12 via the screw shaft fixing member 61 as illustrated in FIG. 5A or 5B.

At this time, the screw shaft fixing member 61 fixed to the fixation plate 12 protrudes toward the movable plate 13 and the fixed end E1 of the ball screw shaft 34, which is a front end of the screw shaft fixing member 61, is placed between the fixation plate 12 and the movable plate 13 as illustrated in the mold opening/closing mechanism 60 according to FIG. 5A or 5B. Then, effects similar to those of the first embodiment are achieved since the gap D1 between the ball screw nut 35 and the screw shaft fixing member 61 is narrower than the gap D2 between the fixation plate 12 and the movable plate 13.

Once the screw shaft fixing member 61 is fixed such that it protrudes toward the movable plate 13 from the fixation plate 12, the length of protrusion of the ball screw shaft 34 and the screw shaft fixing member 61 from the fixation plate 12 toward an injection device (not illustrated) can be minimized. The space between the fixation plate 12 and the injection device is a space entered and left by a worker removing the molten resin (purge resin) that is discharged from the injection device during a molding resin color change or a resin change or removing the molten resin or the like that drops from a nozzle of the injection device during abutting of the nozzle against the mold for molding initiation. The ball screw shaft 34 and the screw shaft fixing member 61 do not protrude to the space, and thus risks in the form of the worker's body part such as his or her head coming into contact with the ball screw shaft 34 and the screw shaft fixing member 61 by mistake can be avoided.

The nut bearing 63 rotatably supporting the ball screw nut 35, the motor 31, and the decelerator (not illustrated) can still be gathered in the case of the structure that is illustrated in FIG. 5A or 5B. Accordingly, the mold opening/closing mechanism 60 can be modularized and assembly of the mold opening/closing mechanism 60 and work for exchange following the assembly can be facilitated.

Figure 4A:
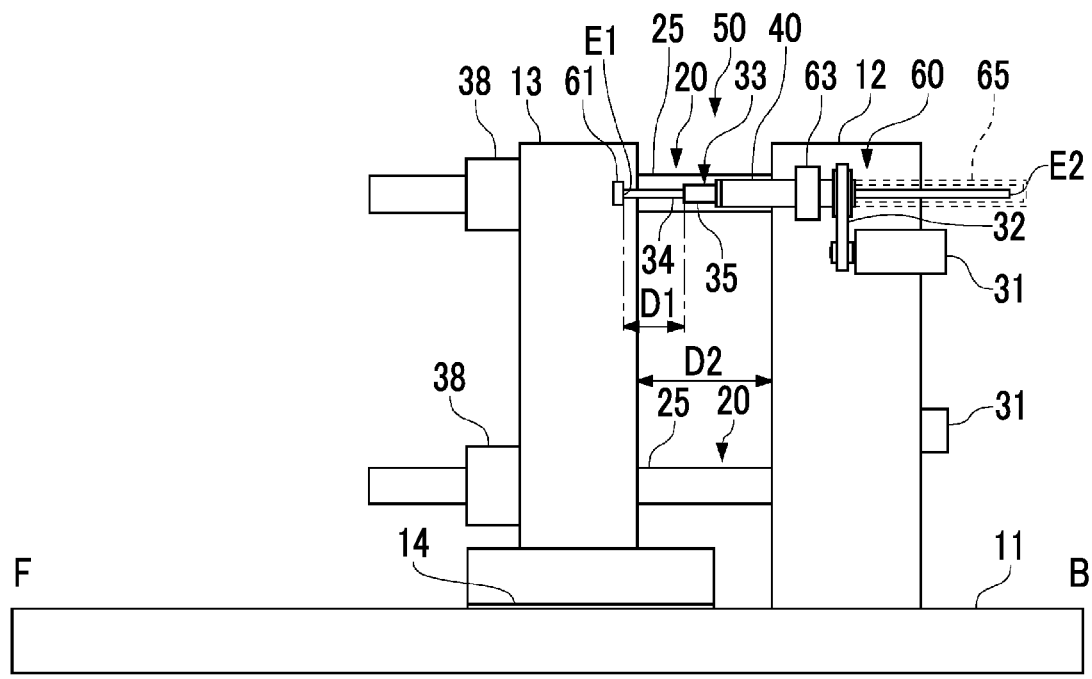
FIGS. 4A and 4B are diagrams illustrating a schematic configuration of a mold clamping device according to a second embodiment of the present invention.
Figure 4B:
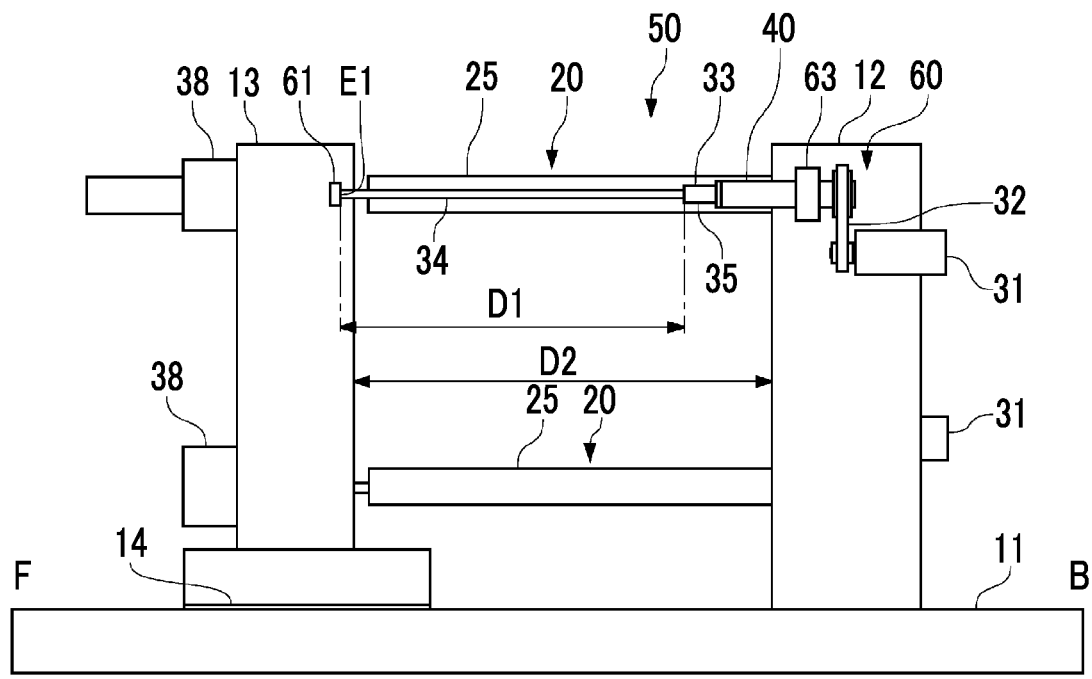
Figure 6A:
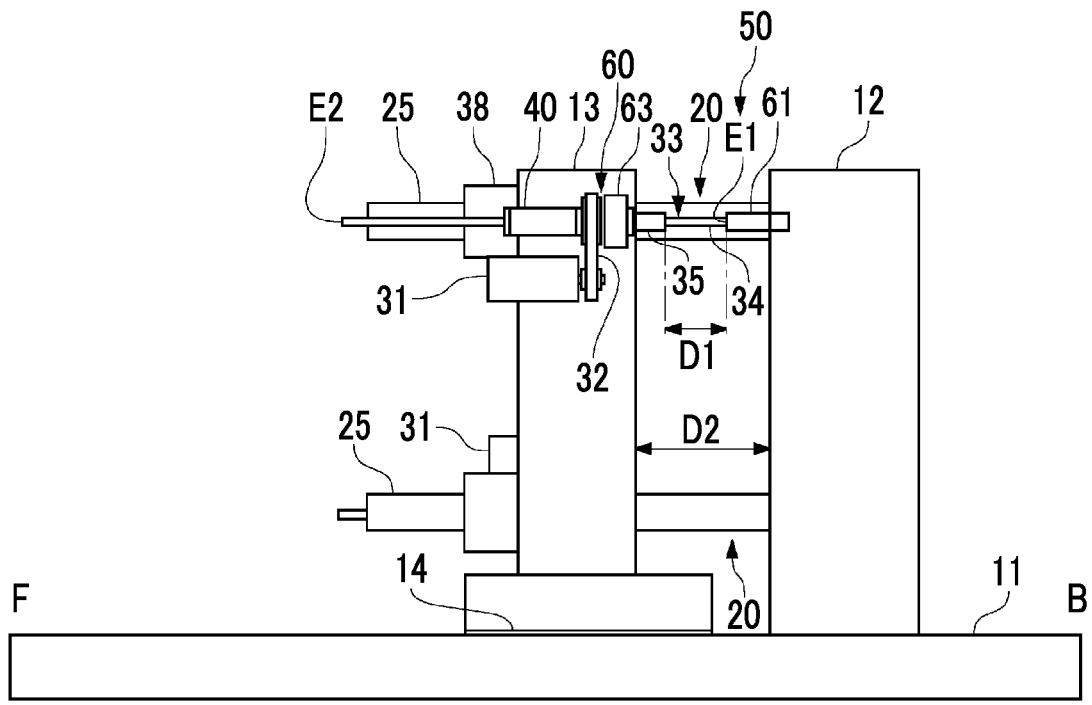
FIGS. 6A and 6B are diagrams illustrating a schematic configuration of a mold clamping device according to a modification example of the second embodiment of the present invention.
Figure 6B:
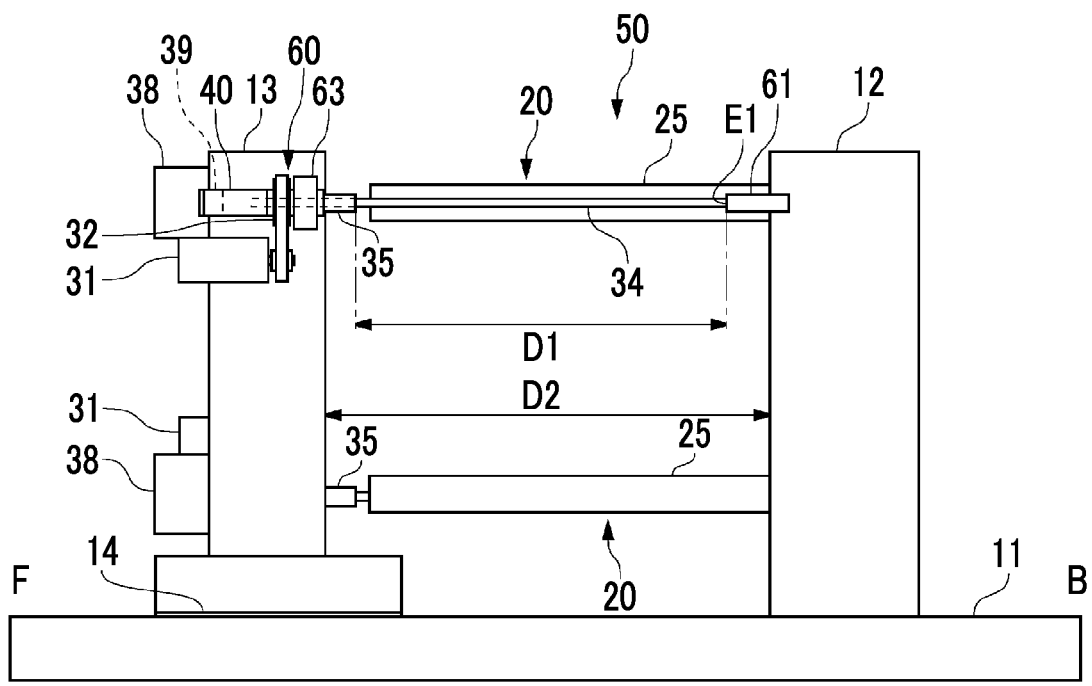

In the second embodiment, the nut supporting member 40 is provided to rotate together with the ball screw nut 35 by the nut supporting member 40 being disposed to be fixed to and supported by the end portion of the ball screw nut 35, which meshes with the ball screw shaft 34, on the side that is opposite to the fixation plate 12, that is, the front side, as illustrated in FIG. 6A and as in the structure that is illustrated in FIG. 4A. Alternatively, although not illustrated, the nut supporting member 40 may be fixed to the movable plate 13, without being fixed to the ball screw nut 35, such that the nut supporting member 40 does not rotate with the ball screw nut 35. These configurations allow the ball screw shaft 34 to be supported on its free end E2 side as well, and thus the vibration of the ball screw shaft 34 can be suppressed with more stability. At this time, the ball screw shaft 34 may be withdrawn from a screw shaft sliding member 39 as illustrated in FIG. 6B in a case where the ball screw nut 35 is away from the fixation plate 12 to a considerable extent. Alternatively, although not illustrated, withdrawal of the ball screw shaft 34 from the screw shaft sliding member 39 may be prevented, even if the ball screw nut 35 is away from the fixation plate 12 to a considerable extent, by the length of the ball screw shaft 34 being sufficiently increased. The screw shaft sliding member 39 will be described later.

The configurations that have been exemplified according to the preferred embodiments of the present invention described above can be optionally selected or appropriately modified to different configurations without departing from the scope of the present invention. Sites of application of the ball screw shaft according to the present invention are not limited to the ball screw shaft for mold opening/closing described above. Instead, the ball screw shaft according to the present invention can also be applied to other ball screw shafts, such as those for injection and ejectors, insofar as those are used in injection molding machines.

Although supporting is conducted at two points in the embodiments described above, one being the fixing point where the ball screw shaft 34 is fixed to the fixation plate 12 or the movable plate 13 and the other one being the supporting point that is supported by the ball screw nut 35, a screw shaft sliding member slidably supporting the ball screw shaft 34 can be provided between the free end E2 of the ball screw shaft 34 and the site where the ball screw nut 35 supports the ball screw shaft 34.

Figure 7A:
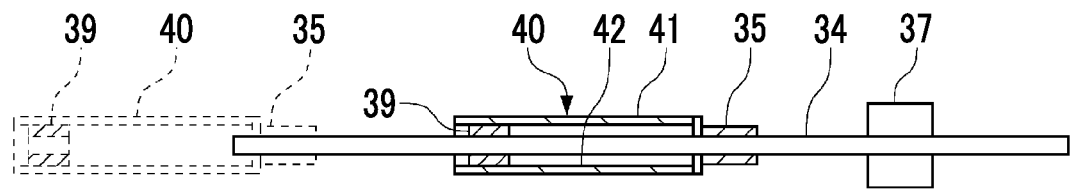
FIGS. 7A-7C are diagrams illustrating an embodiment in which a screw shaft sliding member slidably supporting a ball screw shaft is provided between a free end of the ball screw shaft and a site where a ball screw nut supports the ball screw shaft.

FIG. 7A shows an example corresponding to the first embodiment. In FIG. 7A, the screw shaft sliding member 39 is disposed in the nut supporting member 40. With the ball screw shaft 34 inserted into the screw shaft sliding member 39, the ball screw shaft 34 is supported at three points, that is, the ball screw nut 35, the screw bearing 37, and the screw shaft sliding member 39. Still, the ball screw shaft 34 is withdrawn from the screw shaft sliding member 39, as illustrated by the dashed line in FIG. 6A, once the ball screw nut 35 is moved away from the fixation plate 12 to a considerable extent.

Figure 7B:
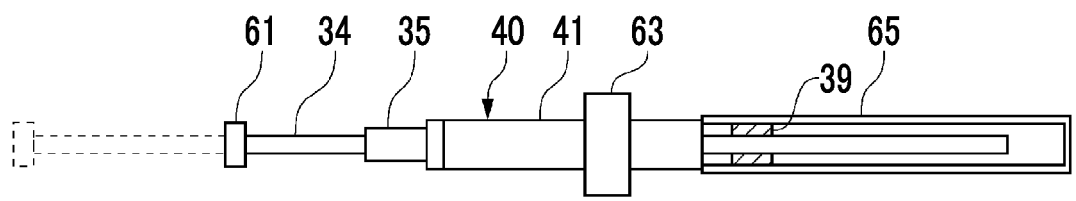
Figure 7C:
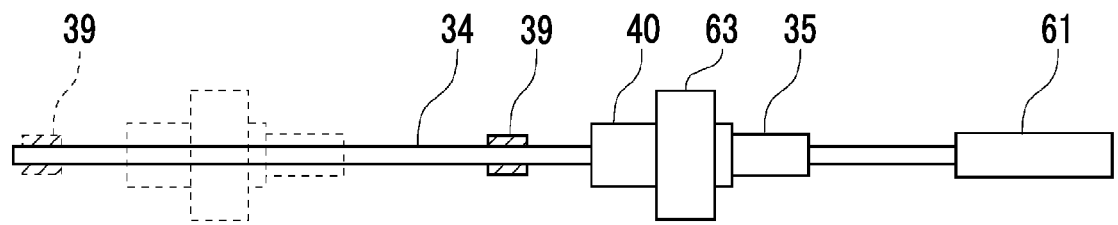

FIGS. 7B and 7C show an example corresponding to the second embodiment. In each of the drawings, the screw shaft sliding member 39 slidably supporting the ball screw shaft 34 is provided between the free end E2 of the ball screw shaft 34 and the site where the ball screw nut 35 supports the ball screw shaft 34.

By the number of the points where the ball screw shaft 34 is supported by the screw shaft sliding member 39 being increased as described above, swinging of the ball screw shaft 34 can be prevented even if the distance between the free end E2 and the supporting portion of the ball screw shaft 34, which is a cantilever beam structure, increases as a result of a movement of the movable plate 13. Accordingly, the moving speed of the movable plate 13 can be increased and damage to the ball screw shaft 34 can be prevented at the same time.

According to FIG. 7A, the screw shaft sliding member 39 guides the rotary motion and reciprocating motion of the ball screw shaft 34, that is, rotational and reciprocating sliding occur. According to FIGS. 7B and 7C, in contrast, sliding of only the reciprocating motion of the ball screw shaft 34 survives if the screw shaft sliding member 39 is fixed to the nut bearing 63 that is fixed to the fixation plate 12 and does not rotate, and this leads to an advantage in the form of little wear of the screw shaft sliding member.

FIGS. 8A-8D show a state where the ball screw shaft 34 has been withdrawn from the screw shaft sliding member 39 when the ball screw nut 35 is away from the fixation plate 12 to a considerable extent. The ball screw 33 illustrated in FIGS. 8A-8D is provided with the configuration that is illustrated in FIG. 3B. At this time, the screw shaft sliding member 39 and the ball screw shaft 34 may be fitted with each other by eccentricity of the position of a central axis C39 of the screw shaft sliding member 39 being allowed such that it does not coincide in a vertical direction V or a horizontal direction H with the position of a central axis C35 of the ball screw nut 35 or the position of a central axis C37 of the screw bearing 37, which is the supporting portion of the ball screw shaft 34. A specific example will be described below.

Figure 8A:
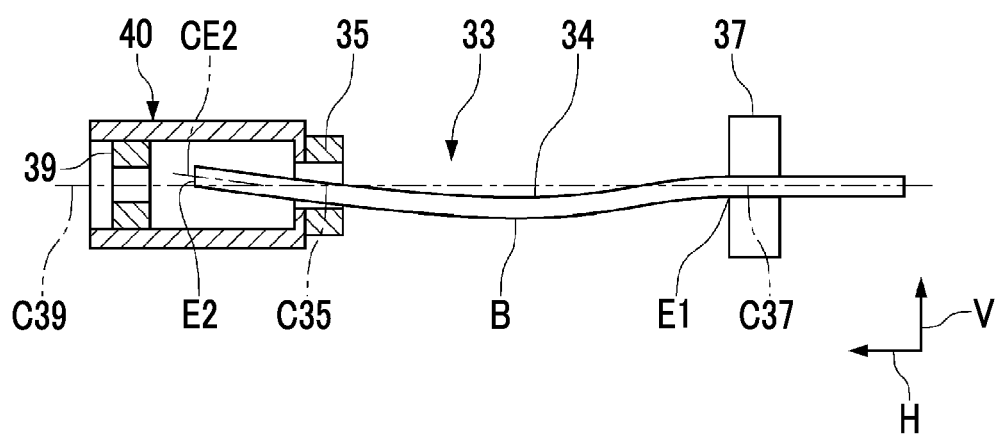
FIGS. 8A-8D show means for dealing with inconvenience attributable to bending of the ball screw shaft.

As illustrated in FIG. 8A, the ball screw shaft 34 that has the fixed end E1 and the free end E2 is a structure supported at each of the fixed end E1 and the ball screw nut 35. When the length of the ball screw shaft 34 significantly exceeds its diameter in this structure, the weight of the ball screw shaft 34 itself might result in a downward and convex deflection B in a region between the fixed end E1 and its position that is supported by the ball screw nut 35. In this case, the part of the ball screw shaft 34 that protrudes toward the free end E2 from the ball screw nut 35 warps up in the vertical direction V as illustrated in FIG. 8A. Then, the position of a central axis CE2 of the free end E2 of the ball screw shaft 34 deviates upwards from the fixed end E1 of the ball screw shaft 34, that is, the position of the central axis C37 of the screw bearing 37 or the position of the central axis CE2 deviates upwards from the position of the central axis C35 of the ball screw nut 35. With this deviation occurring, the ball screw shaft 34 cannot be inserted into the screw shaft sliding member 39.

Figure 8B:
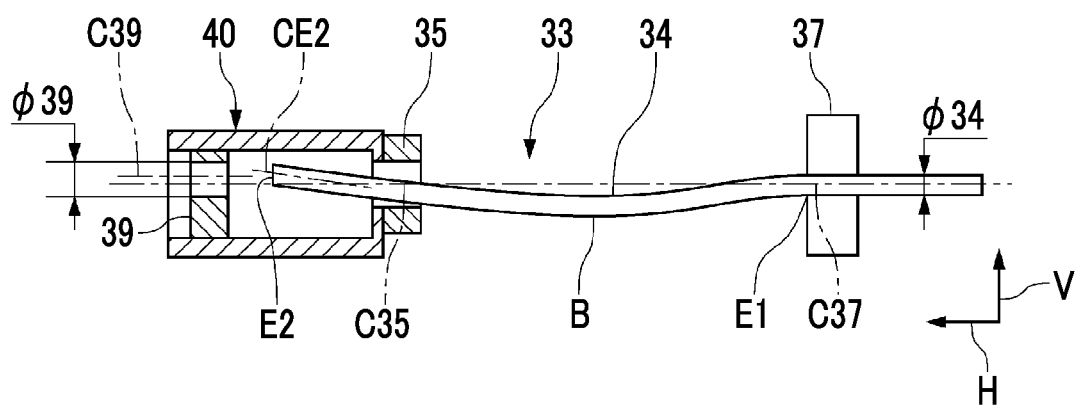

In this regard, the position of the central axis C39 of the screw shaft sliding member 39 is allowed to become eccentric upwards with respect to the position of the central axis C37 or the position of the central axis C35 of the ball screw nut 35 as illustrated in FIG. 8B. Then, interference of the screw shaft sliding member 39 with the free end E2 of the ball screw shaft 34 can be prevented when the movable plate 13 is moved forward and the screw shaft sliding member 39 is fitted with the ball screw shaft 34 from the state where the ball screw shaft 34 has been withdrawn from the screw shaft sliding member 39 by the ball screw nut 35 being moved toward the free end E2 as a result of a backward movement of the movable plate 13. This is similar to the case of the structure that is illustrated in FIG. 6B, in which the ball screw shaft 34 has been withdrawn from the screw shaft sliding member 39 when the ball screw nut 35 is away from the fixation plate 12 to a considerable extent as in the case of FIG. 3B.

Figure 8C:
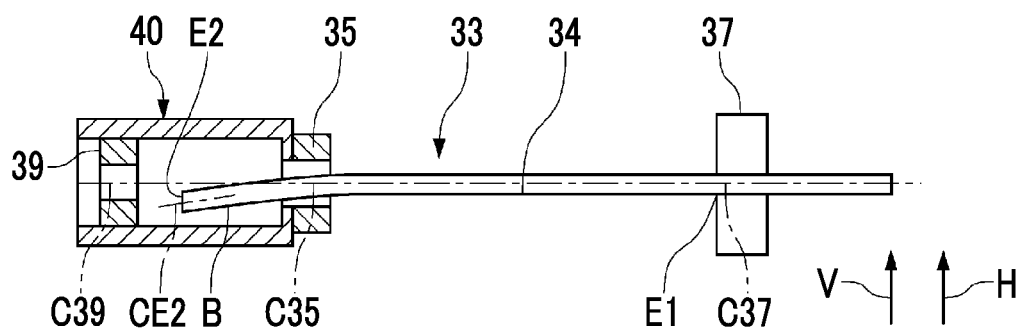
Figure 8D:
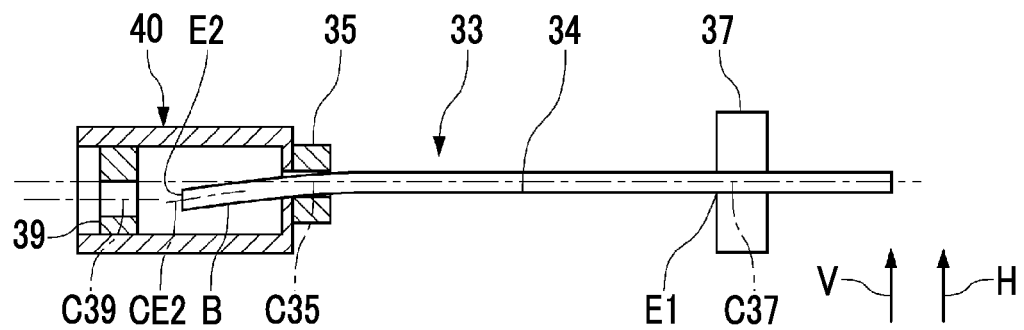

In a case where, for example, the ball screw shaft has a low level of rigidity unlike in the example illustrated in FIGS. 8A and 8B, the part of the ball screw shaft 34 that protrudes toward the free end E2 from the ball screw nut 35 simply exhibits a deflection B drooping in the vertical direction V as illustrated in FIG. 8C. In this case, the position of the central axis CE2 of the free end E2 of the ball screw shaft 34 deviates relatively downwards with respect to the position of the central axis C37 or the position of the central axis C35. In this case, interference of the screw shaft sliding member 39 with the free end E2 of the ball screw shaft 34 needs to be avoided when the movable plate 13 is moved forward and the screw shaft sliding member 39 is fitted with the ball screw shaft 34 from the state where the ball screw shaft 34 has been withdrawn from the screw shaft sliding member 39 by the ball screw nut 35 being moved toward the free end E2 as a result of a backward movement of the movable plate 13. In this regard, the position of the central axis C39 of the screw shaft sliding member 39 may be allowed to become eccentric downwards with respect to the position of the central axis C37 or the position of the central axis C35 of the ball screw nut 35 as illustrated in FIG. 8D.

When the ball screw shaft 34 has a low level of linearity and fine bending remains therein, for example, bending might occur not downwards as illustrated in FIG. 8C but in the horizontal direction H. In this case, the position of the central axis C39 of the screw shaft sliding member 39 may be allowed to become eccentric not downwards as illustrated in FIG. 8D but in any of the horizontal direction H, such that it coincides with the direction of the bending occurring in the ball screw shaft 34, with respect to the position of the central axis C37 of the ball screw shaft 34 or the position of the central axis C35 of the ball screw nut 35. In a case where a plurality of the screw shaft sliding members 39 is disposed, the directions in which the positions of the central axes C39 of the screw shaft sliding member 39 are eccentric with respect to the position of the central axis C37 of the supporting portion of the ball screw shaft 34 or the position of the central axis C35 of the ball screw nut 35 may be identical or different (for example, opposite directions or right-angle directions). In addition, the central axis C39 of at least one of the screw shaft sliding members 39 may be at the same position as, that is, concentric with, the central axis C37 of the supporting portion of the ball screw shaft 34 or the central axis C35 of the ball screw nut 35.

The following effects are achieved when the position of the central axis C39 of the screw shaft sliding member 39 is allowed to become eccentric not to coincide in the vertical direction and the horizontal direction with the position of the central axis C37 of the supporting portion of the ball screw shaft 34 or the position of the central axis C35 of the ball screw nut 35 as described above.

When the screw shaft sliding member 39 and the ball screw shaft 34 have been fitted, it is assumed that the deflection of the ball screw shaft 34 is corrected or bending-deformed by the screw shaft sliding member 39. In this case, the degree of freedom of the vibration of the ball screw shaft 34 is reduced, and thus it is anticipated that design for avoiding the self-excited vibration of the ball screw shaft 34 caused by the ball screw 33 being driven to rotate or the like will be facilitated.

Although the vertical and horizontal directions have been shown herein as typical examples, the free end E2 side of the ball screw shaft 34 might deflect in another direction as well. In this case, the central axis C39 of the screw shaft sliding member 39 may be shifted in the direction in which the deflection occurs.

In a case where the nut supporting member 40 is provided with the screw shaft sliding member 39, a press fitting state may be created during the fitting of the screw shaft sliding member 39 and the ball screw shaft 34 by an inner diameter φ39 of the screw shaft sliding member 39 being allowed to be equal to or smaller than an outer diameter φ34 of the ball screw shaft 34. Then, the lubricant such as grease adhering to the outer diameter portion of the ball screw shaft 34 can be wiped off by the screw shaft sliding member 39 and scattering of the lubricant to the outside of the nut supporting member 40 can be suppressed. At this time, it is preferable that one formed from a resin-based material facilitating fitting surface pressure management is used as the screw shaft sliding member 39 and a material with a low modulus of elasticity is used so that encroachment of the screw shaft sliding member 39 is reduced upon a ball groove of the ball screw shaft 34 increasing the sliding resistance of the screw shaft sliding member 39 and the ball screw shaft 34.

In a case where supporting of the ball screw shaft 34 by the screw shaft sliding member 39 is performed, it is preferable that the distance between the ball screw nut 35 and the screw shaft sliding member 39 is taken into account. Specifically, it is preferable that the gap of the ball screw nut 35 and the screw shaft sliding member is placed such that it does not coincide with the inter-belly or inter-section gap in one or more vibration modes at the natural frequency of the cantilever structure by the ball screw shaft 34. Then, at any position in the stroke of the movement of the gap-fixed ball screw nut 35 and screw shaft sliding member 39 with respect to the ball screw shaft 34, the ball screw nut 35 and the screw shaft sliding member 39 are not positioned in the section of the ball screw shaft at the same time and at least any one of the ball screw nut 35 and the screw shaft sliding member can be positioned in an amplitude portion of the vibration. Accordingly, an increase in amplitude can be suppressed and damage to the ball screw attributable to an increase in vibration can be prevented.

In addition, it is preferable that the ball screw nut 35 and the screw shaft sliding member 39 are placed such that the gap of the ball screw nut 35 and the screw shaft sliding member 39 does not coincide with the inter-belly gap or the inter-section gap in at least any one, two, or all of primary to tertiary vibration modes that are the closest regions to a motor rotation speed region practically used during the mold opening/closing operation of the actual injection molding machine at the natural frequency o the ball screw shaft 34. Furthermore, it is preferable that the gap of the ball screw nut 35 and the screw shaft sliding member 39 is placed such that it does not coincide with the inter-belly gap or the inter-section gap in the primary vibration mode that is the closest to the motor rotation speed region practically used during the mold opening/closing operation, the largest in the degree of freedom of oscillation, and likely to increase the vibration, among the primary to tertiary vibration modes at the natural frequency of the ball screw shaft 34.

It is preferable that the axial length of one or both of the ball screw nut 35 and the screw shaft sliding member 39 is set such that it simultaneously contains the inter-belly gap or the inter-section gap in at least two different vibration modes among the primary to tertiary vibration modes at the natural frequency of the ball screw shaft. Specifically, for example, it is preferable that the axial length of the ball screw nut 35 or the screw shaft sliding member 39 is set such that it is equal to or greater than the relative distance from the position of the belly of the primary vibration mode to the position of the belly of the secondary vibration mode. In this manner, ball screw damage attributable to an increase in vibration in a plurality of vibration modes can be prevented even if the screw shaft sliding member 39 is a single compact member.

The invention claimed is:

1. A mold opening/closing device moving a movable plate holding a movable mold forward and backward with respect to a fixation plate holding a fixed mold, the device, comprising:
 a ball screw mechanism including a ball screw shaft and a ball screw nut meshing with the ball screw shaft; and
 a motor driving the ball screw mechanism,
  wherein one end side of the ball screw shaft is a fixed end by being rotatably or nonrotatably supported by the fixation plate or the movable plate with a movement in an axial direction restricted,
  wherein the other end side of the ball screw shaft is a free end, and
  a screw shaft sliding member is slidably supporting the ball screw shaft and provided between the free end of the ball screw shaft and a site of the ball screw shaft, the site supported by the ball screw nut.

2. The mold opening/closing device according to claim 1, wherein the ball screw nut is placed between the fixation plate and the movable plate in part or in whole.

3. The mold opening/closing device according to claim 1, wherein the fixed end of the ball screw shaft is placed between the fixation plate and the movable plate.

4. The mold opening/closing device according to claim 1,
wherein the fixed end of the ball screw shaft is rotatably supported by the fixation plate,
wherein the ball screw nut is non-rotatably supported by the movable plate, and
wherein the motor is disposed on the fixation plate and allows the ball screw shaft to be driven to rotate.

5. The mold opening/closing device according to claim 1,
wherein the fixed end of the ball screw shaft is rotatably supported by the movable plate,
wherein the ball screw nut is non-rotatably supported by the fixation plate, and
wherein the motor is disposed on the movable plate and allows the ball screw shaft to be driven to rotate.

6. The mold opening/closing device according to claim 1,
wherein the fixed end of the ball screw shaft is non-rotatably supported by the movable plate,
wherein the ball screw nut is rotatably supported by the fixation plate, and
wherein the motor is disposed on the fixation plate and allows the ball screw nut to be driven to rotate.

7. The mold opening/closing device according to claim 1,
wherein the fixed end of the ball screw shaft is non-rotatably supported by the fixation plate,
wherein the ball screw nut is rotatably supported by the movable plate, and
wherein the motor is disposed on the movable plate and allows the ball screw nut to be driven to rotate.

8. A mold clamping device, comprising:
at least two of the mold opening/closing device according to claim 1,
wherein the at least two mold opening/closing devices are placed at symmetrical positions in a front view of the movable plate and the fixation plate.

9. The mold clamping device according to claim 8, wherein a first mold opening/closing device of the at least two mold opening/closing devices is placed at a position lower than that of a second mold opening/closing device of the at least two mold opening/closing devices.

10. The mold clamping device according to claim 8, wherein a first mold opening/closing device of the at least two mold opening/closing devices and a second mold opening/closing device of the at least two mold opening/closing devices are placed at diagonal positions in the front view of the movable plate and the fixation plate.

11. The mold opening/closing device according to claim 1, wherein a gap between the ball screw nut and the screw shaft sliding member is set to not coincide with a distance between two adjacent antinodes or a distance between two adjacent nodes at a natural frequency of the ball screw shaft in at least one vibration mode of the ball screw shaft.

12. The mold opening/closing device according to claim 1, wherein a gap between the ball screw nut and the screw shaft sliding member is set to not coincide with a distance between two adjacent antinodes or a distance between two adjacent nodes at a natural frequency of the ball screw shaft in at least one of primary to tertiary vibration modes of the ball screw shaft, and each of the primary to tertiary vibration modes are different from each other.

13. The mold opening/closing device according to claim 1, wherein an axial length of at least one of the ball screw nut or the screw shaft sliding member is set to simultaneously cover a distance between two adjacent antinodes or a distance between two adjacent nodes at a natural frequency of the ball screw shaft in at least two different modes among primary to tertiary vibration modes of the ball screw shaft, and each of the primary to tertiary vibration modes are different from each other.

14. The mold opening/closing device according to claim 4, wherein a supporting member non-rotatably fixing the ball screw nut is lower in flexural rigidity than the ball screw shaft.

15. The mold opening/closing device according to claim 6, wherein a supporting member non-rotatably fixing the fixed end of the ball screw shaft is lower in flexural rigidity than the ball screw shaft.

16. The mold opening/closing device according to claim 1, wherein a position of a central axis of the screw shaft sliding member deviates from a position of a central axis of a supporting portion of the ball screw shaft or deviates from a position of a central axis of the ball screw nut.

17. The mold opening/closing device according to claim 1, wherein an inner diameter of the screw shaft sliding member is equal to an outer diameter of the ball screw shaft or is smaller than the outer diameter.

18. The mold opening/closing device according to claim 1, wherein the fixed end of the ball screw shaft is supported by an outer side surface of the fixation plate or an outer side surface of the movable plate, the outer side surfaces of the fixation and movable plates facing a direction crossing the axial direction, respectively.

19. A mold opening/closing device moving a movable plate holding a movable mold forward and backward with respect to a fixation plate holding a fixed mold, the device, comprising:
a ball screw mechanism including a ball screw shaft and a ball screw nut meshing with the ball screw shaft; and
a motor driving the ball screw mechanism,
wherein one end side of the ball screw shaft is a fixed end by being rotatably or nonrotatably supported by the fixation plate or the movable plate with a movement in an axial direction restricted,
wherein the other end side of the ball screw shaft is a free end,
wherein a gap between the ball screw nut and the fixed end is narrower than a gap between the fixation plate and the movable plate, and
wherein a screw shaft sliding member is slidably supporting the ball screw shaft and provided between the free end of the ball screw shaft and a site of the ball screw shaft, the site supported by the ball screw nut.

* * * * *